(12) United States Patent
Honda

(10) Patent No.: US 10,603,831 B2
(45) Date of Patent: Mar. 31, 2020

(54) RUBBER EXTRUDING MACHINE AND RUBBER EXTRUDING METHOD

(71) Applicant: Sumitomo Rubber Industries, Ltd., Kobe-shi, Hyogo (JP)

(72) Inventor: Shinichiro Honda, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 39 days.

(21) Appl. No.: 15/868,259

(22) Filed: Jan. 11, 2018

(65) Prior Publication Data

US 2018/0222105 A1 Aug. 9, 2018

(30) Foreign Application Priority Data

Feb. 8, 2017 (JP) .................. 2017-021479

(51) Int. Cl.
| | |
|---|---|
| *B29C 48/15* | (2019.01) |
| *B29C 48/25* | (2019.01) |
| *B29C 48/49* | (2019.01) |
| *B29C 48/30* | (2019.01) |
| *B29C 48/305* | (2019.01) |
| *B29C 48/08* | (2019.01) |
| *B29L 30/00* | (2006.01) |
| *B29K 105/24* | (2006.01) |

(52) U.S. Cl.
CPC ............. *B29C 48/30* (2019.02); *B29C 48/08* (2019.02); *B29C 48/15* (2019.02); *B29C 48/267* (2019.02); *B29C 48/307* (2019.02); *B29C 48/49* (2019.02); *B29K 2105/246* (2013.01); *B29L 2030/002* (2013.01)

(58) Field of Classification Search
CPC ......... B29C 48/30; B29C 48/76; B29C 48/18; B29C 48/268; B29C 48/765; B29C 48/49
USPC ...................... 425/203, 812, 133.5
See application file for complete search history.

(56) References Cited

U.S. PATENT DOCUMENTS 4,491,417 A * 1/1985 Hold .................. B29C 48/467
366/75
6,296,464 B1 * 10/2001 Purstinger ............... B29C 48/09
425/72.1

(Continued)

FOREIGN PATENT DOCUMENTS

| JP | 2002-086540 A | 3/2002 |
|---|---|---|
| JP | 2005-349597 A | 12/2005 |

(Continued)

*Primary Examiner* — Peter L Vajda
*Assistant Examiner* — Caroline Montiel
(74) *Attorney, Agent, or Firm* — Birch, Stewart, Kolasch & Birch LLP

(57) ABSTRACT

A rubber extruding machine 1 comprises two or more rubber extruders 2, an extrusion head 3 to which the rubber extruders 2 are connected, and a decompression device 4. A pre-former 6 of the extrusion head comprises: rubber flow paths 20 including respective flow paths 22 through which the extruded unvulcanized rubber compounds G pass respectively; a merging position P at which the rubber flow paths 20 are confluent; and a vent channel 21 whose one end communicates with the merging position P and the other end is connected to the decompression device.

5 Claims, 7 Drawing Sheets

(56) References Cited

U.S. PATENT DOCUMENTS 7,311,505 B2 * 12/2007 Ohki ................. B29C 48/30
                                                                                                  425/133.5
2005/0271761 A1    12/2005  Ohki et al.

FOREIGN PATENT DOCUMENTS

JP          2008302660 A  *  12/2008
JP            4863392 B2     1/2012

* cited by examiner

RUBBER EXTRUDING MACHINE AND RUBBER EXTRUDING METHOD

TECHNICAL FIELD

The present invention relates to a rubber extruding machine and a rubber extruding method capable of extruding a shaped rubber body comprising different rubber sections, while preventing occurrence of trapped gas (void) between the rubber sections.

BACKGROUND ART

For instance, a tread rubber which is one of rubber members of a vehicle tire is usually formed from a shaped rubber body made up of different rubber compounds so as to have a plurality of rubber sections in a cross-section of the shaped rubber body in order to improve tire performance.

FIG. 7(A) shows a shaped rubber body K1 for a tread rubber having the radially outermost rubber section Ya (so-called cap rubber layer) of a rubber compound Ga which is excellent in abrasion resistance, and a radially inner rubber-section Yb (so-called base rubber layer) of a high-modulus rubber compound Gb.

FIG. 7(B) shows another shaped rubber body K2 for a tread rubber having the above-mentioned rubber sections Ya and Yb and further rubber sections Yc and Yd (so-called wing rubber) of a rubber compound Gc which is excellent in adhesion strength, disposed on both sides of the sections Ya and Yb.

Such a shaped rubber body (K1, K2) having a plurality of rubber sections can be formed by using a rubber extruding machine comprising multiple rubber extruders for different rubber compounds connected to a single extrusion head. See Patent Documents 1 and 2.

Patent Document 1: Japanese Patent Application Publication No. 2002-86540
Patent Document 2: Japanese Patent Application Publication No. 2005-349597 on the other hand, when a shaped rubber body is formed by being extruded from such rubber extruding machine, there is a possibility that gas (air) is trapped between the rubber sections (layers) and remained as voids in the shaped rubber body.

Japanese Patent No. 4863392 discloses a rubber extruder whose cylinder is provided with a degassing device.

If this rubber extruder is used in the above-mentioned rubber extruding machine comprising multiple rubber extruders, it may be possible to remove air or gas in the rubber extruded from each rubber extruder.

However, when the extruded rubbers are merged by passing through an extrusion head (die), there is still the possibility that gas or air is trapped between the rubber sections.

SUMMARY OF THE INVENTION

Problems to be Solved by the Invention

It is therefore, an object of the present invention to provide a rubber extruding machine and rubber extruding method which can extrude a shaped rubber body having rubber sections in a cross section thereof, while preventing the occurrence of trapped gas (void) between the rubber sections.

According to one aspect of the present invention, a rubber extruding machine for extruding a shaped rubber body to have, in its cross section, a plurality of rubber sections, comprises:

a plurality of rubber extruders for extruding unvulcanized rubber compounds forming the respective rubber sections, an extrusion head to which front ends of the rubber extruders are connected, and a decompression device connected to the extrusion head, wherein the extrusion head comprises a pre-former into which the extruded unvulcanized rubber compounds are fed so as to be combined and pre-shaped, the pre-former comprises a plurality of rubber flow paths including respective flow paths through which the above-said extruded unvulcanized rubber compounds pass respectively, a merging position at which the rubber flow paths are confluent, and a vent channel whose one end communicates with the merging position and the other end is connected to the decompression device.

It is preferable that the above-said one end of the vent channel has a slit-shaped opening to the merging position which has a slit width of not more than 0.03 mm.

According to another aspect of the present invention, a rubber extruding method for extruding a shaped rubber body of which cross section is divided into a plurality of rubber sections, comprises a step of extruding the shaped rubber body by the use of the above-said rubber extruding machine.

In the present invention, therefore, it is possible to remove gas (air) from a position where the unvulcanized rubber compounds extruded from the rubber extruders meet and are merged, therefore, the entrainment of gas between the unvulcanized rubber compounds can be effectively suppressed.

DESCRIPTION OF THE PREFERRED EMBODIMENTS

Embodiments of the present invention will now be described in detail in conjunction with accompanying drawings.

Figure 1:
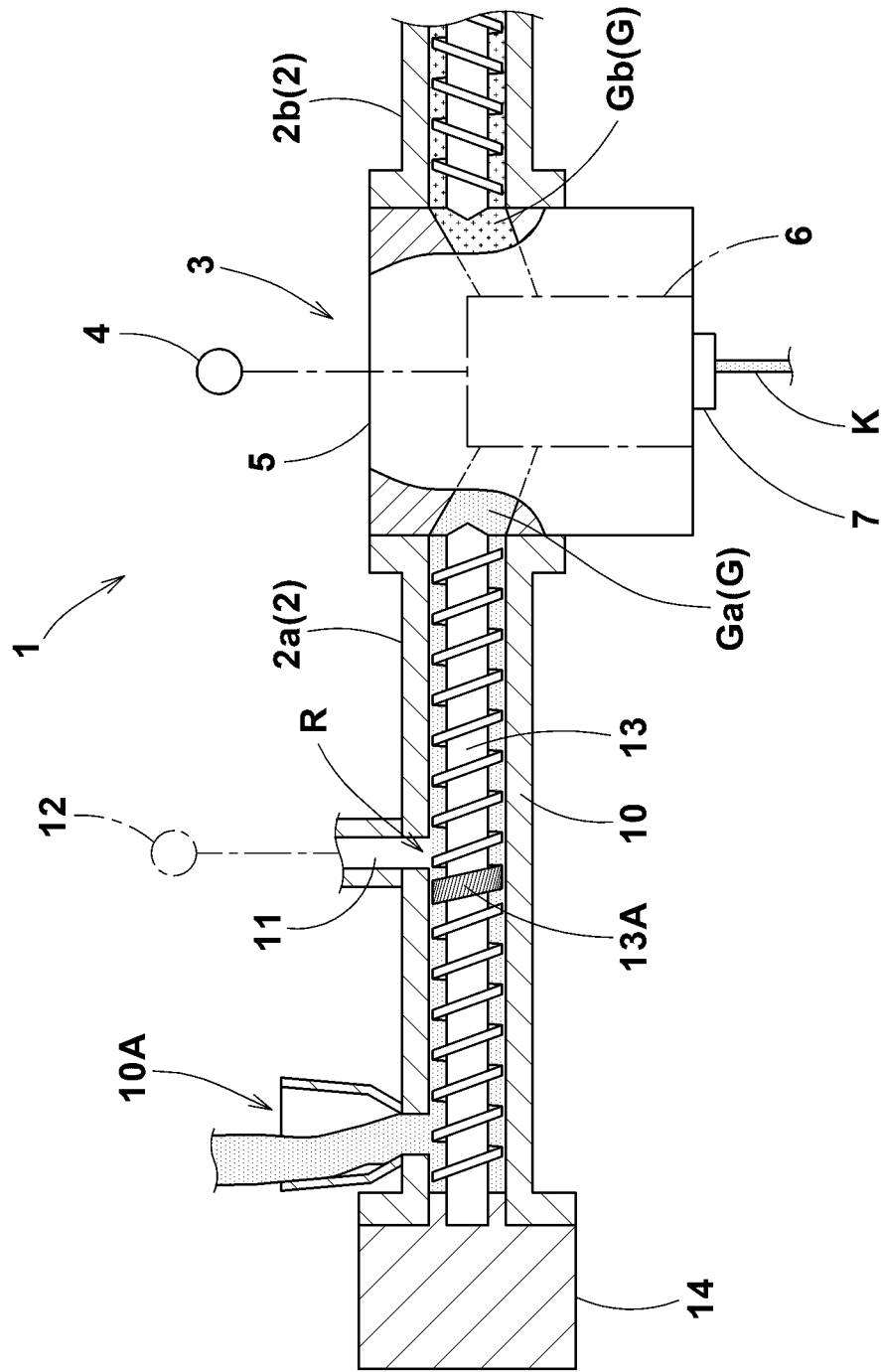
FIG. 1 is a partial cross sectional view of a rubber extruding machine as an embodiment of the present invention.

According to the present invention, a rubber extruding machine 1 comprises a plurality of rubber extruders 2, an extrusion head 3 to which front ends of the rubber extruders 2 are attached, and a decompression device 4 connected to the extrusion head 3 as shown in FIG. 1

The rubber extruding machine 1 is for shaping and extruding a shaped rubber body K of which cross section is divided into a plurality of rubber sections Y corresponding to unvulcanized rubber compounds G respectively extruded from the rubber extruders 2.

Figure 7A:
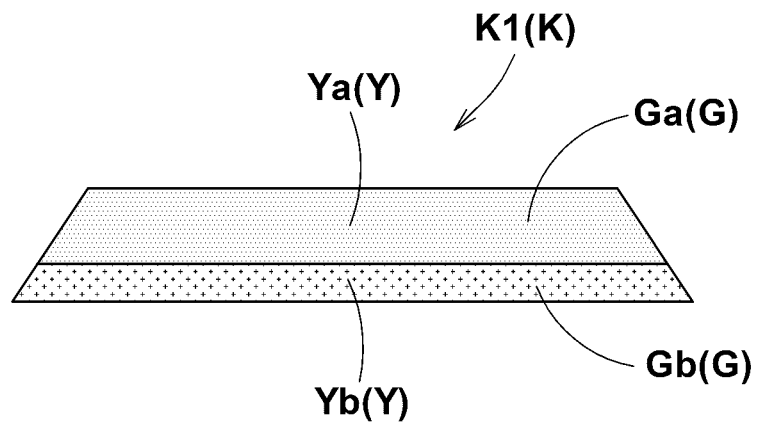
FIGS. 7(A) and 7(B) are cross-sectional views each showing an example of the shaped rubber body.

In this example, the rubber extruding machine 1 is used to manufacture the shaped rubber body K1 for a tire tread rubber shown in FIG. 7(A). Thus, the shaped rubber body K1 is composed of a rubber section Ya of an unvulcanized rubber compound Ga for a radially outer tread rubber layer so-called "cap rubber layer", and a rubber section Yb of an unvulcanized rubber compound Gb for a radially inner tread rubber layer so-called "base rubber layer".

In this example, therefore, a shaped rubber body K1 of which cross section is divided into two rubber sections Ya and Yb is formed from two unvulcanized rubber compounds Ga and Gb respectively extruded from two rubber extruders 2a and 2b (generically "2").

The rubber extruder 2 in this example is a vent-type rubber extruder comprising a cylinder 10 provided with a vent hole 11 from which degassing is effected by a decompression device (vacuum pump) 12 to remove the gases (including air) contained in the unvulcanized rubber compound G from extruder. More specifically, the rubber extruder 2 comprises the cylinder 10 provided in its rear end portion in the extrusion direction with a hopper 10A, a screw 13 disposed in the cylinder 10 concentrically thereto, an actuator 14 for rotating the screw 13, and the decompression device 12.

The screw 13 is provided with a shuttering 13A on the front side in the extrusion direction (the downstream side) of the hopper 10A.

The cylinder 10 is provided with the vent hole 11 positioned on the front side in the extrusion direction (the downstream side) of the shuttering 13A. Thereby, a vent region R communicating with the vent hole 11 is formed between the screw 13 and the cylinder 10. The vent hole 11 is connected with the decompression device 12.

The unvulcanized rubber compound G kneaded within the cylinder 10 is thinned when passing over the shuttering 13A, and after passed over the shuttering 13A, it is immediately decompressed so that gases mixed in the unvulcanized rubber compound G are deaerated.

In order to enhance the degassing effect, a plurality of grooves extending in the axial direction are formed on the outer circumferential surface of the shuttering 13A in this example so as to increase the surface area of the unvulcanized rubber compound G passed over the shuttering 13A.

The extrusion head 3 comprises
a head main body 5 to which front ends of the rubber extruders 2 are attached,
a pre-former 6 attached to the head main body 5, and
an extrusion die 7 attached to the pre-former 6.

Figure 2:
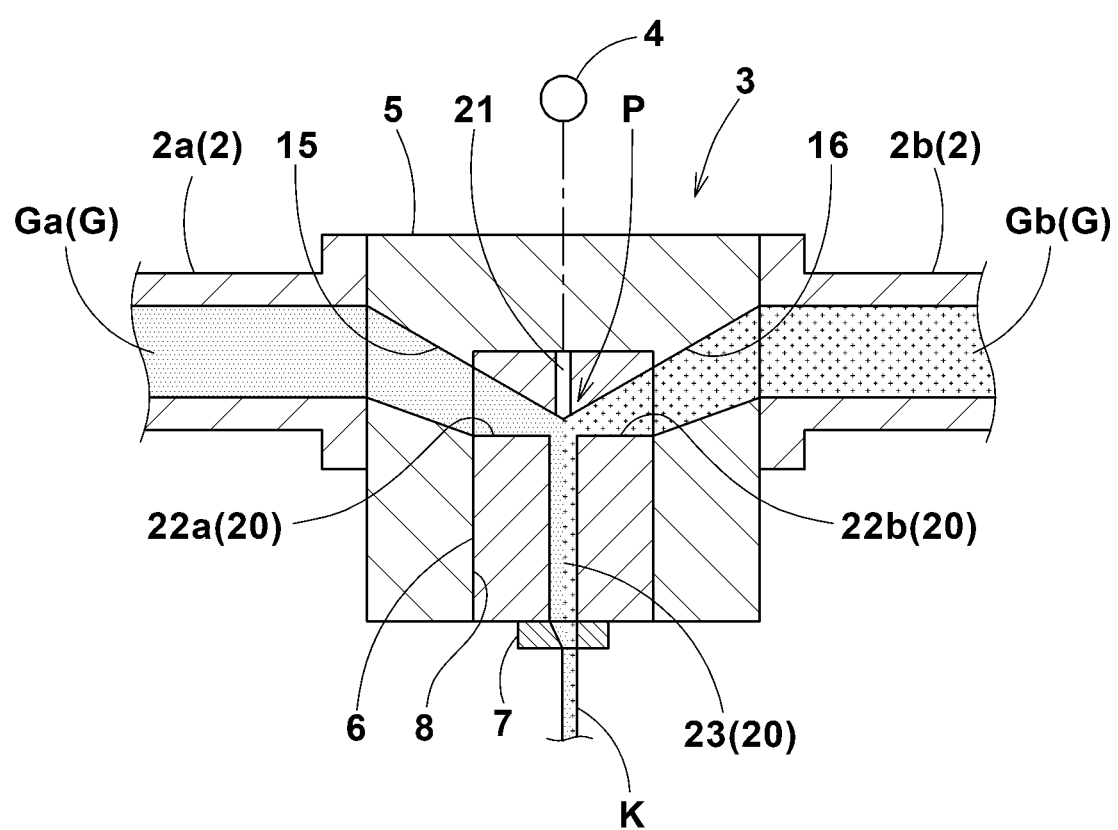
FIG. 2 is a cross sectional view of the extrusion head thereof.

As shown in FIG. 2, the head main body 5 is provided with a head flow path 15 which guides the unvulcanized rubber compound Ga from the rubber extruder 2a to the pre-former 6, and a head flow path 16 which guides the unvulcanized rubber compound Gb from the rubber extruder 2b to the pre-former 6.

The head main body 5 in this example is provided with a bottom-open recess 8, and the pre-former 6 is inserted in the recess 8 from the opened bottom.

In this example, the head flow paths 15 and 16 are respectively opened at both sides of the recess 8.

The pre-former 6 is a block fitting into the recess 8, and combines the unvulcanized rubber compounds Ga and Gb into one and then pre-shapes the combination.

Figure 3:
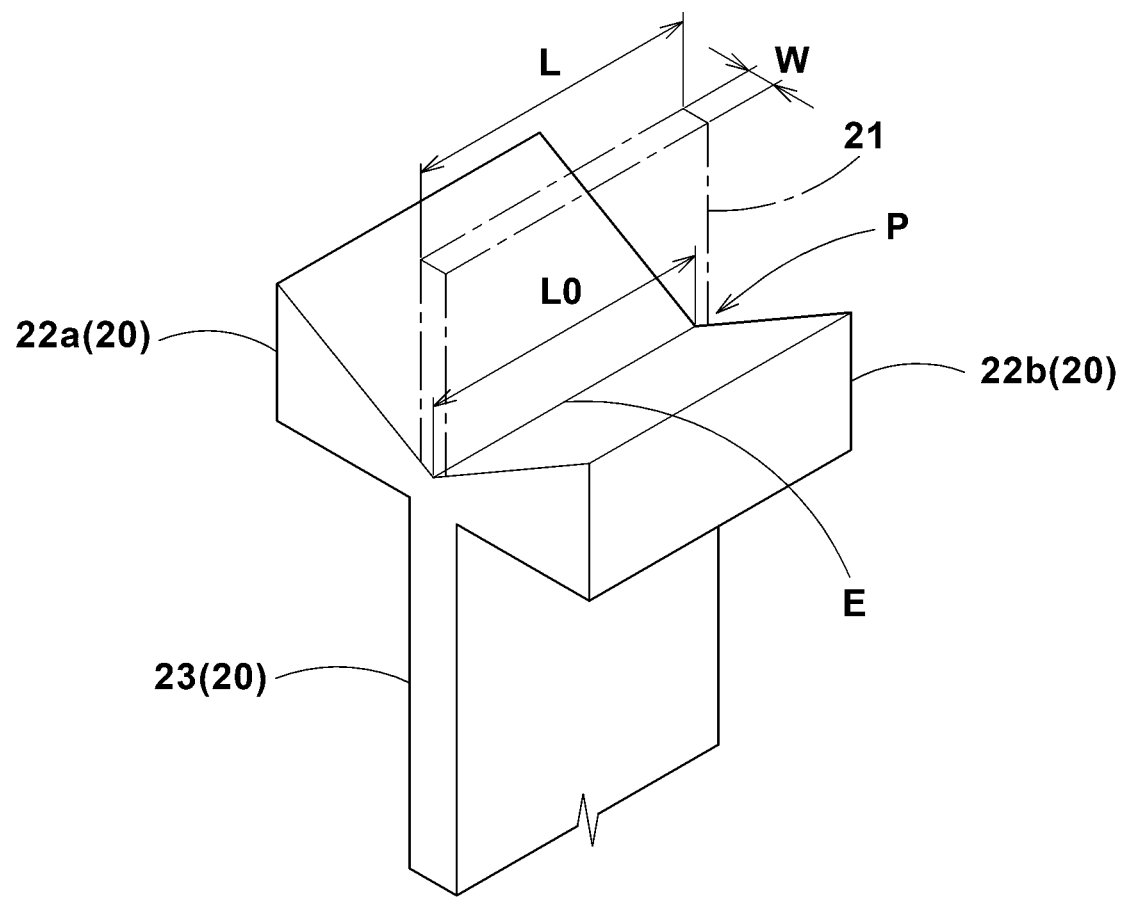
FIG. 3 is a perspective diagram showing only the rubber flow paths of the extrusion head shown in FIG. 2.
Figure 4:
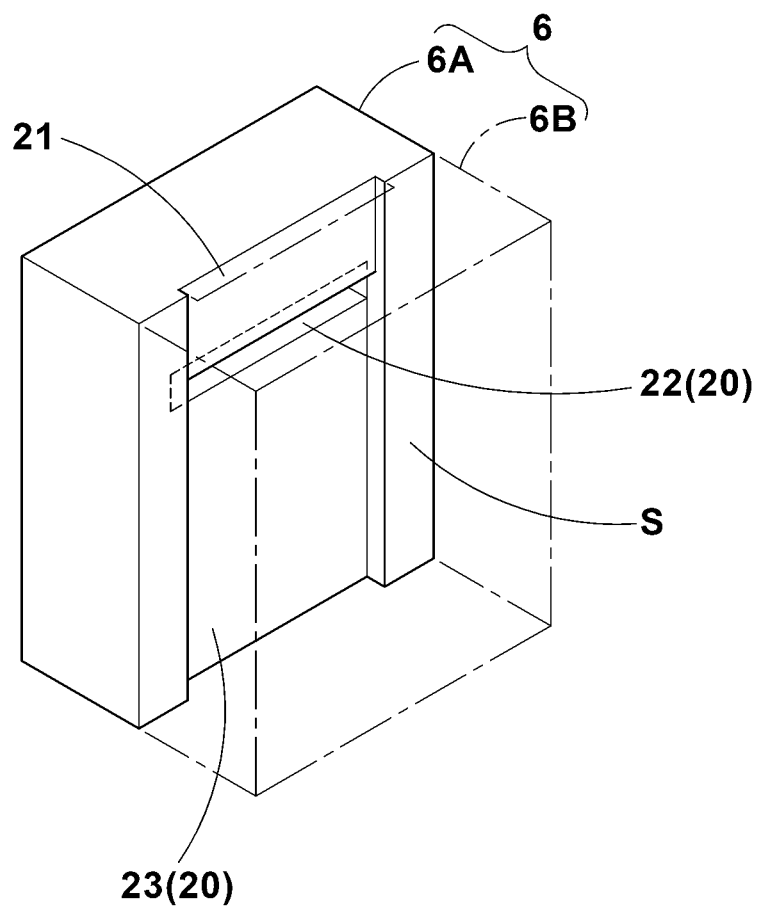
FIG. 4 is a perspective view showing a part of the pre-former.

More specifically, as shown in FIGS. 2 and 3, the pre-former 6 comprises a plurality of rubber flow paths 20, at least one merging position P, and at least one vent channel 21 communicating therewith.

The rubber flow paths 20 include
respective flow paths 22 through which the unvulcanized rubber compounds G extruded from the respective rubber extruders 2 pass respectively, and
a final merge path 23 through which all of the unvulcanized rubber compounds G pass together.

Figure 5:
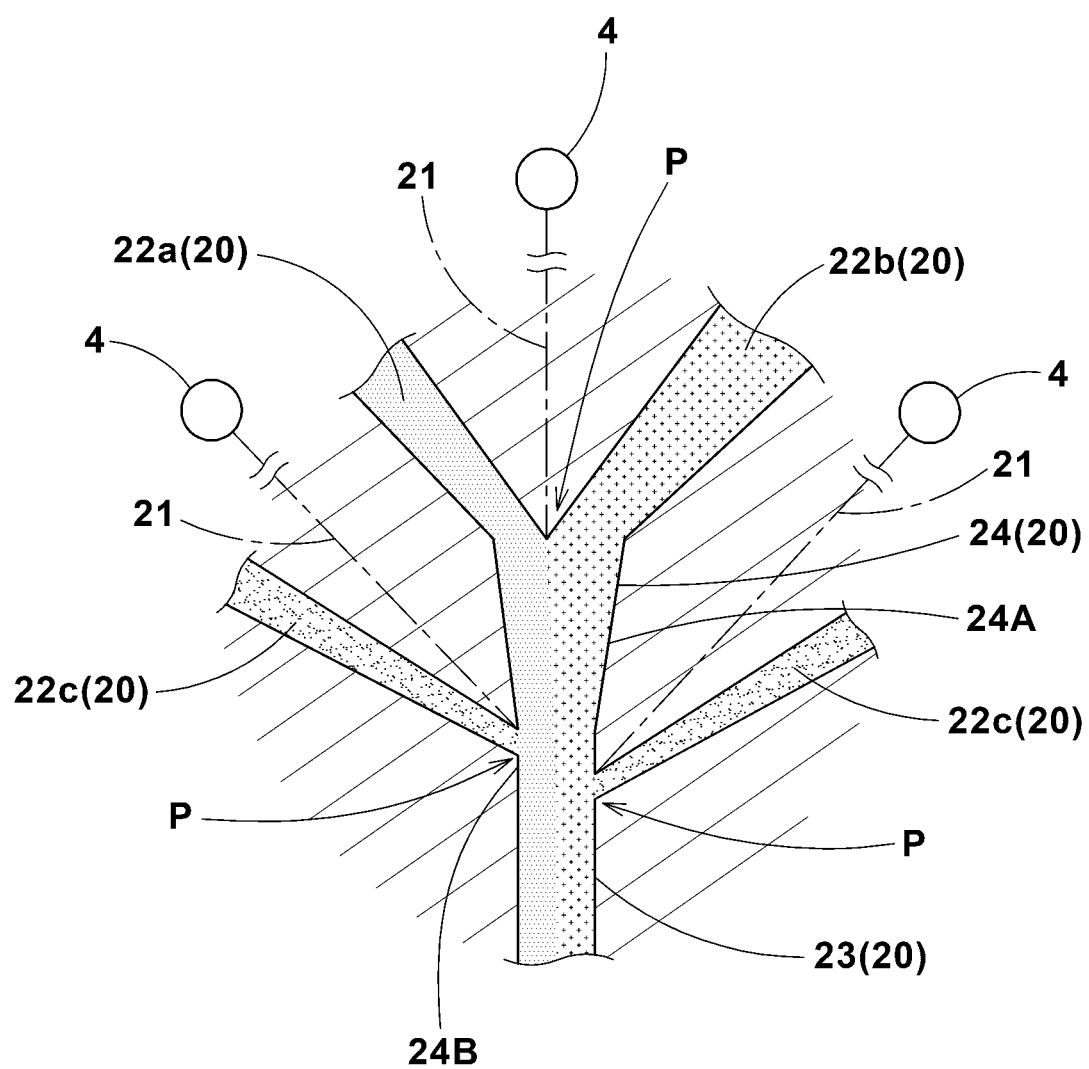
FIG. 5 is a cross-sectional partial view showing another example of the rubber flow paths of the pre-former.

Depending on the number of the rubber extruders 2, it is possible for the rubber flow paths 20 to include an intermediate merge path 24 between the respective flow paths 22 and the final merge path 23, for example as shown in FIG. 5 which is described later.

In the example shown in FIGS. 2 and 3, the rubber flow paths 20 are two respective flow paths 22a and 22b through which the unvulcanized rubber compounds Ga and Gb extruded from the rubber extruders 2a and 2b pass respectively, and one final merge path 23 through which the unvulcanized rubber compounds Ga and Gb pass together in one.

The merging position P is a position where the rubber flow paths 20 are merged into one path.

The pre-former 6 in this example has the single merging position P where the respective flow path 22a (rubber flow path 20) and the respective flow path 22b (rubber flow path 20) are merged into one path.

Depending on the number of rubber extruders 2, the pre-former 6 may have a plurality of the merging positions P, for example, three merging positions P as shown in FIG. 5.

The or each vent channel 21 has one end connected to the decompression device 4 and the other end communicating with the single merging position P as in this example or one of the merging positions P as in another example.

When there are a plurality of merging positions P for example three as shown in FIG. 5, one vent channel 21 is provided for each merging position P.

The vent channel 21 is preferably formed as a slit extending along a line E of intersection between the rubber flow paths 20 as shown in FIG. 3.

Preferably, the slit length L of the vent channel 21 is not less than 60%, more preferably not less than 80% of the length L0 of the line E of intersection.

Such slit-shaped vent channel 21 can discharge gases (air) existing in the unvulcanized rubber compounds G from the merging position P so as to prevent entrainment of the gases between the merged unvulcanized rubber compounds G.

When sucking the air from the vent channel 21 by the use of the decompression device 4, if the slit width (gap) W exceeds 0.05 mm, there is a possibility that the unvulcanized rubber compounds G easily penetrates into the vent channel 21 by the suction pressure, and the vent channel 21 is clogged.

Therefore, it is preferable that the slit width (gap) w is less than 0.05 mm, preferably not more than 0.03 mm.

As the decompression device 4, for example, a vacuum pump can be used. The suction pressure p1 (gauge pressure) by the decompression device 4 is preferably not higher than −20 kPa, more preferably not higher than −40 kPa.

The inner pressure p2 (gauge pressure) of the rubber flow paths 20 is preferably not lower than +20 kPa, more preferably not lower than +40 kPa.

It is preferable that the pre-former 6 is composed of, for example, two pieces 6A and 6B split by a vertical plane extending along the line E of intersection as shown in FIG.

4. Thus, it is possible to easily and accurately form the slit-shaped vent channel 21 in the division surfaces s.

Figure 6:
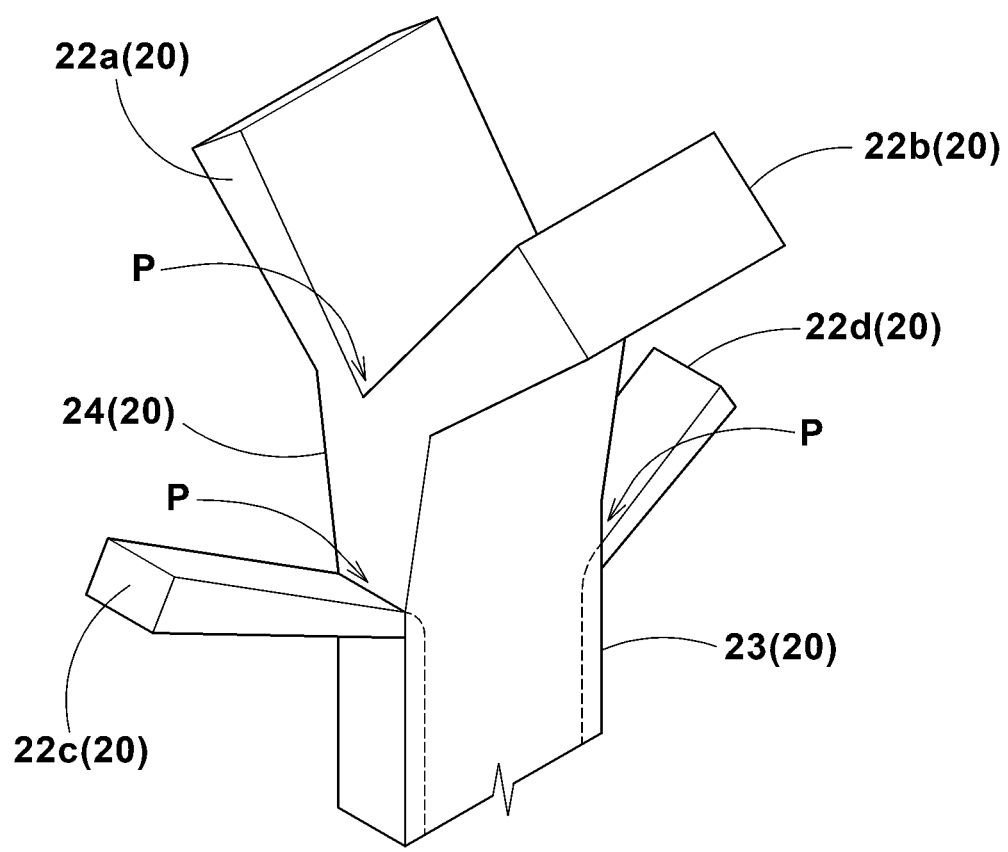
FIG. 6 is a perspective diagram showing only the rubber flow paths in FIG. 5.
Figure 7B:
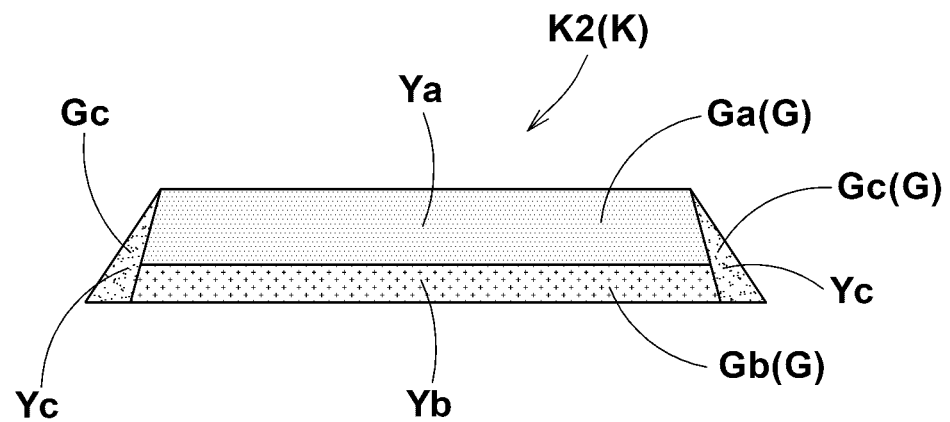

FIGS. 5 and 6 show another example of the pre-former 6. In this example, four rubber extruders 2 are attached to the extrusion head 3, and a shaped rubber body K2 shown in FIG. 7(B) is formed from four unvulcanized rubber compounds Ga, Gb, Gc and Gc respectively extruded from the four rubber extruders 2.

In this example, the rubber flow paths 20 include:

a respective flow path 22a through which the unvulcanized rubber compound Ga passes;

a respective flow path 22b through which the unvulcanized rubber compound Gb passes;

a first intermediate merge path 24A into which the respective flow paths 22a and 22b are merged;

a second intermediate merge path 24B into which a respective flow path 22c through which the unvulcanized rubber compound Gc passes, and the first intermediate merge path 24A are merged, and a final merge path 23 into which a second respective flow path 22c through which the second unvulcanized rubber compound Gc passes, and the second intermediate merge path 24B are merged.

Accordingly, there are three merging positions P:

the first merging position P of the respective flow paths 22a and 22b, the second merging position P of the respective flow path 22c and the first intermediate merge path 24A, and the third merging position P of the second respective flow path 22c and the second intermediate merge path 24B. And there are formed three vent channels 21 respectively communicating with the three merging positions P.

In the example shown in FIG. 5, the three vent channels 21 are respectively connected to three decompression devices 4. But, it is also possible to connect the three vent channels 21 to a single decompression device 4.

In the first embodiment, the two rubber extruders 2 are arranged on the opposite sides of the extrusion head 3. However, according to the present invention, the arrangement of a plurality of rubber extruders 2 is not limited to such opposite arrangement. For example, the rubber extruders 2 are obliquely arranged on the same side of the extrusion head 3, or arranged radially around the extrusion head 3 or the like.

While detailed description has been made of preferable embodiments of the present invention, the present invention can be embodied in various forms without being limited to the illustrated embodiments.

Comparison Tests

In order to confirm the effect of the present invention, by using the rubber extruding machine having the structure shown in FIGS. 1-4, a shaped rubber body for the tire tread rubber shown in FIG. 7(A) was extruded.

In the embodiment, the decompression device was used so that the suction pressure p1 (gauge pressure) became −20 kPa.

In a comparative example, the vent channel was closed, and the suction pressure p1 (gauge pressure) was 0 kPa since the decompression device was not used.

The shaped rubber bodies extruded under the above different conditions were checked for the occurrence of trapped gas at the interface between the rubber sections Ya and Yb.

Further, using each shaped rubber body as a tread rubber, a pneumatic tire was manufactured in order to test the durability of the tread rubber.

(1) Occurrence of Trapped Gas

The shaped rubber body was cut at right angle with respect to the extrusion direction. Then, using a scanning electron microscope of 1000-3000 times power, the interface between the rubber sections Ya and Yb in the cut surface was observed to count the number of voids formed at the interface by the trapped gas and having a volume of 4.19 cubic micron or more. The results are shown in Table 1.

(2) Durability:

Using a tire test drum, each pneumatic tire was run at a speed of 230 km/h under a tire load of 6 kN, and the runnable time until damage occurred in the tread rubber was measured. The results are shown in Table 1.

TABLE 1

|  | Comparative Example | Embodiment |
|---|---|---|
| pre-former |  |  |
| vent channel | closed | opened |
| decompression | No | Yes |
| suction pressure | 0 kPa | −20 kPa |
| number of voids | 3 | 0 |
| durability (minutes) | 51 | 62 |

As shown in Table, it was confirmed that, according to the present invention, the occurrence of trapped gas (voids) can be effectively prevented, and the durability of the tread rubber can be improved.

DESCRIPTION OF THE REFERENCE SIGNS 1 rubber extruding machine
2 rubber extruder
3 extrusion head
4 decompression device
6 pre-former
20 rubber flow path
21 vent channel
22 respective flow path
G unvulcanized rubber compound
K shaped rubber body
P merging position
Y rubber section

The invention claimed is:

1. A rubber extruding machine for extruding a shaped rubber body to have, in its cross section, a plurality of rubber sections, comprising:

a plurality of rubber extruders for extruding unvulcanized rubber compounds forming the respective rubber sections, an extrusion head to which the rubber extruders are connected, and a decompression device connected to the extrusion head, wherein the extrusion head comprises a pre-former into which the extruded unvulcanized rubber compounds are fed so as to be combined and pre-shaped, the pre-former comprises a plurality of rubber flow paths including respective flow paths through which the above-said extruded unvulcanized rubber compounds pass respectively, a merging position at which the rubber flow paths are confluent, and a vent channel having a first end that communicates with the merging position and a second end that is connected to the decompression device, wherein
said first end of the vent channel has a slit-shaped opening which opens to the merging position of the rubber flow paths, and
said slit-shaped opening extends along a line (E) of intersection between the rubber flow paths and has a slit width of not more than 0.03 mm.

2. A rubber extruding method for extruding a shaped rubber body of which cross section is divided into a plurality of rubber sections, comprising a step of extruding the shaped rubber body by the use of the rubber extruding machine according to claim 1.

3. The rubber extruding machine according to claim 1, wherein said vent channel has a slit length (L) along the line (E) of intersection which is not less than 80% of the length (L0) of the line (E) of intersection.

4. A rubber extruding machine for extruding a shaped rubber body to have, in its cross section, a plurality of rubber sections, comprising:
a plurality of rubber extruders for extruding unvulcanized rubber compounds forming the respective rubber sections, and
an extrusion head to which front ends of the rubber extruders are connected,
wherein
the extrusion head comprises a pre-former into which the extruded unvulcanized rubber compounds are fed so as to be combined and pre-shaped;
the pre-former comprises
a plurality of rubber flow paths including flow paths through which said extruded unvulcanized rubber compounds pass respectively, and
a plurality of merging positions at which two of said plurality of rubber flow paths are confluent;
each of the merging positions is provide with a vent channel having a slit-shaped opening which opens to the merging position;
the slit-shaped opening extends along a line (E) of intersection between said two of the plurality of rubber flow paths and has a slit width of not more than 0.03 mm; and
a decompression device for removing gas from interfaces between said rubber sections is connected to said vent channel.

5. The rubber extruding machine according to claim 4, wherein
said unvulcanized rubber compounds include a first, second, third and fourth unvulcanized rubber compound;
said plurality of rubber flow paths include:
a first flow path through which the first unvulcanized rubber compound passes;
a second flow path through which the second unvulcanized rubber compound passes;
a third flow path through which the third unvulcanized rubber compound passes;
a fourth flow path through which the fourth unvulcanized rubber compound passes;
a first merge path, into which the first flow path and the second flow path are merged to have a first merging position, which has a tetragonal cross-sectional shape with opposite shorter sides and opposite longer sides; and
a final merge path, into which the first merge path, the third flow path and the fourth flow path are merged to have a second merging position between the first intermediate merge path and the third flow path, and a third merging position between the first intermediate merge path and the fourth flow path,
wherein
the first flow path and the second flow path are merged from the respective longer sides of the first merge path,
the third flow path and the fourth flow path are merged from the respective shorter sides of the first merge path, and
each of the first, second and third merging positions is provided with said slit-shaped opening.

* * * * *